United States Patent
Kotz

(10) Patent No.: US 10,960,802 B2
(45) Date of Patent: Mar. 30, 2021

(54) HEADREST

(71) Applicant: GRAMMER AG, Amberg (DE)

(72) Inventor: Maximilian Kotz, Rieden (DE)

(73) Assignee: GRAMMER AG, Ursensollen (DE)

( * ) Notice: Subject to any disclaimer, the term of this patent is extended or adjusted under 35 U.S.C. 154(b) by 0 days.

(21) Appl. No.: 16/297,668

(22) Filed: Mar. 10, 2019

(65) Prior Publication Data
US 2019/0308536 A1    Oct. 10, 2019

(30) Foreign Application Priority Data

Apr. 10, 2018  (DE) .......................... 102018108520.6
Apr. 20, 2018  (DE) .......................... 102018109611.9

(51) Int. Cl.
| | |
|---|---|
| *B60N 2/80* | (2018.01) |
| *B60N 2/806* | (2018.01) |
| *B60N 2/829* | (2018.01) |
| *B60N 2/838* | (2018.01) |
| *B60N 2/85* | (2018.01) |
| *B60N 2/862* | (2018.01) |
| *B60N 2/853* | (2018.01) |

(52) U.S. Cl.
CPC .............. *B60N 2/862* (2018.02); *B60N 2/829* (2018.02); *B60N 2/853* (2018.02)

(58) Field of Classification Search
CPC ........ B60N 2/829; B60N 2/853; B60N 2/862; B60N 2/806; B60N 2/85
USPC ....................................................... 297/408
See application file for complete search history.

(56) References Cited

U.S. PATENT DOCUMENTS

| | | | | |
|---|---|---|---|---|
| 4,304,439 A | * | 12/1981 | Terada ..................... | A47C 7/38 297/408 X |
| 4,640,549 A | * | 2/1987 | Yokota .................. | B60N 2/865 297/408 X |
| 4,668,014 A | * | 5/1987 | Boisset .................. | B60N 2/853 297/408 |
| 4,733,913 A | * | 3/1988 | Tateyama ............... | B60N 2/847 297/409 |
| 4,840,429 A | * | 6/1989 | Stockl .................. | A61G 15/125 248/118 |
| 5,052,754 A | * | 10/1991 | Chinomi ................ | B60N 2/829 297/408 |

(Continued)

FOREIGN PATENT DOCUMENTS

| | | | |
|---|---|---|---|
| DE | 4305909 A1 | * 9/1994 | ............... B60N 2/48 |
| DE | 10138248 A | 12/2002 | |

(Continued)

*Primary Examiner* — Rodney B White
(74) *Attorney, Agent, or Firm* — Andrew Wilford

(57) ABSTRACT

A headrest has a base carrying the headrest on a seat, a head piece forming an abutment for a head, and a four-bar linkage including a first link and at least one second link therebehind in a direction of displacement. Each link is secured at one pivot with the base and at another pivot with the head piece such that the head piece is movable by the four-bar linkage relative to the base between a first end position and a second end position. An adjuster can alter and/or arrest the relative position between one of the links and the head piece, or between one of the links and the base. This adjuster has a first slotted link fixed on one of the first and second links, a second slotted link fixed on the head piece or the base, and a slide block engaged in slots of the first and second slotted links.

6 Claims, 6 Drawing Sheets

(56) References Cited

U.S. PATENT DOCUMENTS

| | | | |
|---|---|---|---|
| 5,433,508 A * | 6/1995 | Akinna et al. | B60N 2/829 297/410 |
| 6,082,817 A * | 7/2000 | Muller | B60N 2/1842 297/216.12 |
| 6,270,161 B1 * | 8/2001 | De Filippo | B60N 2/838 297/410 |
| 6,550,856 B1 * | 4/2003 | Ganser | B60N 2/20 297/408 X |
| 6,688,697 B2 * | 2/2004 | Baumann | B60N 2/865 297/408 X |
| 6,715,829 B2 * | 4/2004 | Svantesson | B60N 2/865 297/216.12 |
| 6,962,392 B2 * | 11/2005 | O'Connor | B60N 2/862 297/408 X |
| 7,073,856 B2 * | 7/2006 | Akaike | B60N 2/0232 297/216.12 |
| 7,195,313 B2 * | 3/2007 | Hippel et al. | B60N 2/853 297/408 X |
| 7,344,191 B2 * | 3/2008 | Schilling | B60N 2/888 297/216.12 |
| 7,350,859 B2 * | 4/2008 | Klukowski | B60N 2/888 297/216.12 |
| 7,455,363 B2 * | 11/2008 | Chung | B60N 2/809 297/407 |
| 7,484,797 B2 * | 2/2009 | Akaike | B60N 2/821 297/216.12 |
| 7,517,015 B2 * | 4/2009 | Terada | B60N 2/888 297/216.12 |
| 7,520,564 B2 * | 4/2009 | Woerner | B60N 2/865 297/408 X |
| 7,611,196 B2 * | 11/2009 | Terada | B60N 2/888 297/216.12 |
| 7,618,091 B2 * | 11/2009 | Akaike | B60N 2/002 297/216.12 |
| 7,717,507 B2 * | 5/2010 | Toda | B60N 2/888 297/216.12 |
| 7,766,423 B2 * | 8/2010 | Alexander | B60N 2/888 297/216.12 |
| 7,883,148 B2 * | 2/2011 | Alexander | B60N 2/832 297/216.12 |
| 7,963,598 B2 * | 6/2011 | Akaike | B60N 2/888 297/216.12 |
| 8,020,935 B2 * | 9/2011 | Becker et al. | B60N 2/829 297/410 |
| 8,033,601 B2 * | 10/2011 | Otsuka | B60N 2/888 297/216.12 |
| 8,109,567 B2 * | 2/2012 | Alexander | B60N 2/888 297/216.12 |
| 8,573,702 B2 * | 11/2013 | Tscherbner et al. | B60N 2/829 297/410 |
| 8,616,633 B2 * | 12/2013 | Truckenbrodt | B60N 2/888 297/216.12 |
| 8,833,851 B2 * | 9/2014 | Corral Rodriguez | B60N 2/888 297/216.12 |
| 8,936,311 B2 * | 1/2015 | Corral Rodriguez | B60N 2/809 297/216.12 |
| 9,333,887 B2 * | 5/2016 | Talamonti | B60N 2/821 |
| 9,789,794 B1 * | 10/2017 | Roychoudhury | B60N 2/42781 |
| 10,315,546 B2 * | 6/2019 | An | A47C 7/38 |
| 10,703,242 B2 * | 7/2020 | Spackman | B60N 2/876 |
| 2001/0028191 A1 * | 10/2001 | Lance | B60N 2/853 297/410 |
| 2002/0043860 A1 * | 4/2002 | Dinkel et al. | B60N 2/853 297/410 |
| 2004/0195872 A1 * | 10/2004 | Svantesson | B60N 2/853 297/216.12 |
| 2004/0195895 A1 * | 10/2004 | Sedlatschek et al. | A47C 7/36 297/408 |
| 2004/0262974 A1 * | 12/2004 | Terada | B60N 2/865 297/407 |
| 2005/0127726 A1 * | 6/2005 | Schilling | B60N 2/862 297/216.12 |
| 2006/0226689 A1 * | 10/2006 | Linnenbrink et al. | B60N 2/829 297/408 |
| 2007/0075578 A1 | 4/2007 | Klukowski | |
| 2007/0145803 A1 * | 6/2007 | Kopetzky et al. | B60N 2/829 297/410 |
| 2007/0246989 A1 * | 10/2007 | Brockman | B60N 2/865 297/391 |
| 2011/0089737 A1 | 4/2011 | Tscherbner et al. | |
| 2012/0161489 A1 * | 6/2012 | Nam | B60N 2/829 |
| 2015/0015049 A1 * | 1/2015 | Mueller et al. | B60N 2/829 297/410 |
| 2015/0130247 A1 * | 5/2015 | Kondrad et al. | B60N 2/829 297/410 |
| 2015/0130248 A1 * | 5/2015 | Line et al. | B60N 2/829 297/410 X |
| 2015/0251577 A1 * | 9/2015 | Ishihara | B60N 2/868 297/216.12 |
| 2015/0258924 A1 * | 9/2015 | Ishihara | B60N 2/4228 297/216.12 |
| 2016/0046218 A1 * | 2/2016 | Worlitz et al. | B60N 2/829 297/410 X |
| 2017/0313220 A1 * | 11/2017 | Line | B60N 2/6009 |
| 2018/0222368 A1 * | 8/2018 | Nuss et al. | B60N 2/853 |
| 2018/0345839 A1 | 12/2018 | Jeong | |
| 2019/0168649 A1 * | 6/2019 | Watson | B60N 2/829 |
| 2020/0039406 A1 * | 2/2020 | Nuss | B60N 2/847 |

FOREIGN PATENT DOCUMENTS

| | | | |
|---|---|---|---|
| DE | 102012104559 A1 * | 11/2013 | B60N 2/829 |
| JP | 58-121913 A | 7/1983 | |
| KR | 1020100130002 A | 12/2010 | |

\* cited by examiner

HEADREST

FIELD OF THE INVENTION

The invention relates to a headrest for a seat, in particular for the seat of a vehicle. A vehicle in the sense of the invention is a land, air, or water vehicle.

BACKGROUND OF THE INVENTION

Such a headrest is known for example from DE 10 2018 106 698. It includes a head piece having a head-support face and mountable with a base to a seat, in particular to a vehicle seat or a vehicle structure. The head piece is supported on the base by a four-bar linkage, and can thus be moved between a first position and a second position, and can be locked into the set position.

OBJECT OF THE INVENTION

It is the object of the invention to provide a headrest with which an automatic adjustment of the head piece and, if necessary, a locking of same is possible.

SUMMARY OF THE INVENTION

The headrest comprises a base that supports the headrest on a seat or a firm structure near a seat. Furthermore, the headrest includes a head piece that forms an abutment for the head of a seat occupant. Further, the headrest includes a four-bar linkage that comprises a first link and at least one second link therebehind in an adjustment direction, and each link includes at least one link that forms at least one pivot on the base and at least one pivot on the head piece. For example two front link elements in the adjustment direction, form the first link, and two rear link elements form the second link, the link elements of the first link and the link elements of the second link for example are parallel to one another.

The head piece is movable between a first end position and a second end position, by means of the four-bar linkage, relative to the base. The head piece can, in the movement between the first position and the second position, carry out for example a substantially horizontal movement or for example a substantially vertical movement, corresponding to the motion path and the orientation of the four-bar linkage relative to the seat. With an adjuster with a least one adjusting element, the relative position between one of the links and the head piece or between one of the links and the base is alterable and/or arrestable.

For example with the adjuster, the angle between a link and head piece or the base can be altered, in that the adjuster is fastened to the link and to the head piece or the base, and increases or decreases the angle.

In this way, the head piece can moved, with little space requirement, between the first position and the second position.

For example a link is rigidly connected to a first slotted link, and a second slotted link moves with the head piece, and an adjusting element movable by a drive unit is movable in the first slotted link and in the second slotted link. The head piece pivoted on the four-bar linkage has a defined position relative to the four-bar linkage in each position of the movement between the first and the second position. The adjusting element guided in both slotted links can set the relative positions in that the head piece and the four-bar linkage are forced into a certain relative position.

The adjustment speed of the four-bar linkage can be pre-specified, as needed, via the movement path of the slotted links, i.e. via the movement path of the central axes to one another.

A longitudinal central axis of the first slotted link or of the second slotted link is for example constructed corresponding to a motion path run through by the adjusting element that, during the movement of the head piece between the first position and the second position, moves a primary end of the respectively different slotted link to a secondary end, wherein it engages in the first slotted link and in the second slotted link. The adjusting element can for example be formed by a cylindrical pin or also comprise other geometries.

The first slotted link is for example configured parallel to a longitudinal central axis of a link of the first link. In this way, the adjusting element can be moved by means of a linear drive that diminishes the construction outlay. A straight slotted link path has the advantage that the drive can be rigidly fastened to the part of the headrest in this case, for example with a link or with a link pair that also the slotted link is assigned. In the event for example of a curved-shaped course of the slotted link path, the drive would have to be mounted or configured in such a manner that the slide block can follow the slotted link path. It is, however, not necessary for the invention that one of the slotted links be straight.

The adjuster includes for example a drive that moves the adjusting element. The drive can for example be a commercially available motor, in particular an electric motor. This requires little space and can for example be integrated into the headrest. Alternatively, however, other drives can also come into consideration.

For example the adjuster includes a transmission that can convert movement of the drive into movement of the adjusting element. In this way, the movement can extend between drive and adjusting element. Furthermore, a translation of the forces/movements can take place with the transmission.

The transmission comprises for example a spindle that is driven by the drive and that moves a spindle nut on the adjusting element. For example the adjusting element is fastened indirectly or directly to the spindle nut. According to an alternative embodiment, the spindle can also not be rotatable. In this case, for example the spindle nut is rotatably driven. The spindle can for example be fixed to the slide block, and the drive spindle nut alters the spacing between the spindle and spindle nut.

Each adjuster is for example formed by two link elements movably connected with one another and pivoted on opposite ends of the head piece.

BRIEF DESCRIPTION OF THE DRAWING

Further advantages result based on one of the embodiments schematically shown in the drawing. Therein.

SPECIFIC DESCRIPTION OF THE INVENTION

Figure 1:
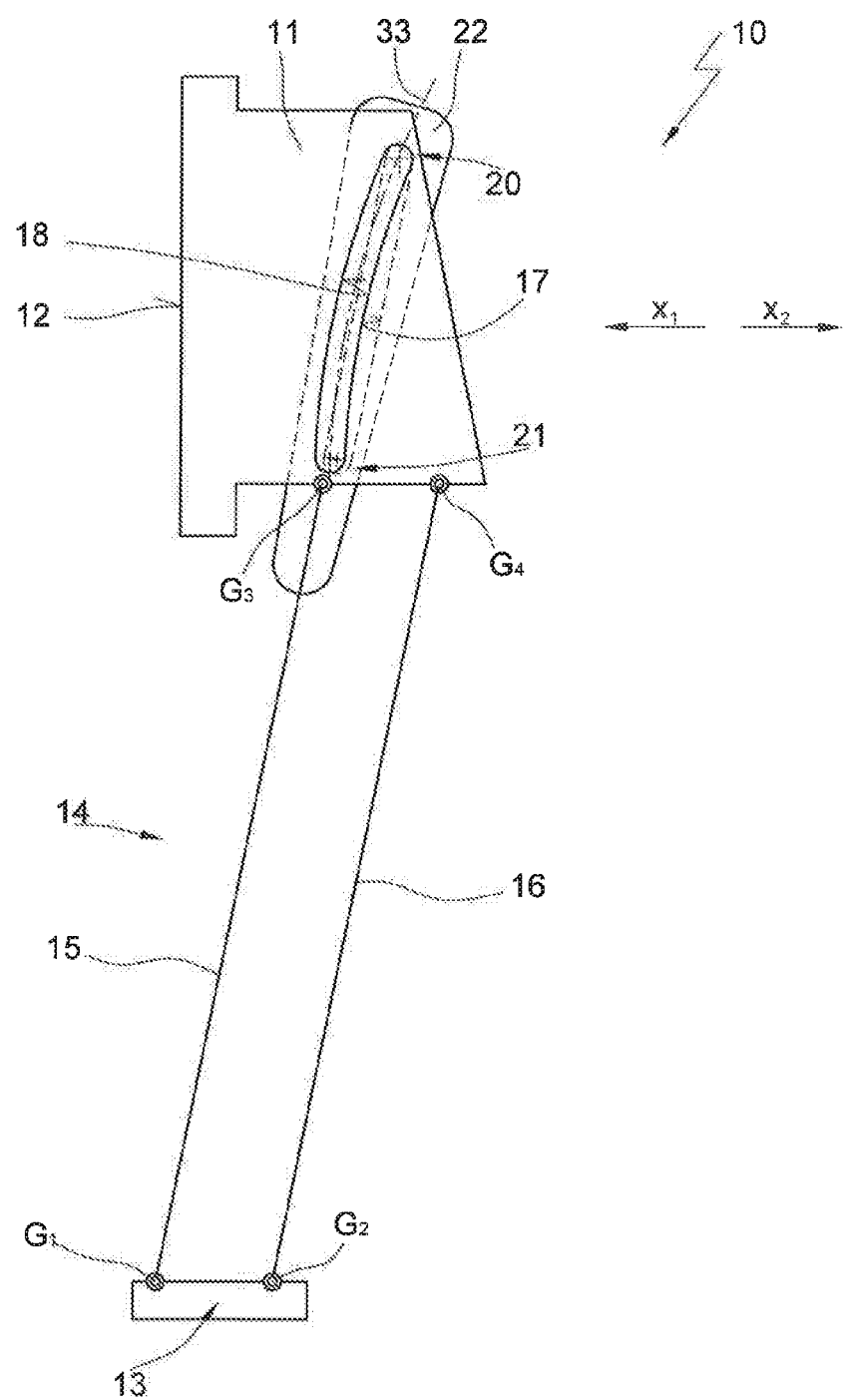
FIG. 1 is a side view of the headrest with an adjuster merely partially shown.

The headrest is referred to generally with reference character 10. The same reference characters in the different Figures refer to the same parts, even if lower-case letter postscripts are used or omitted.

The headrest includes a head piece 11 with a head-support face 12 that serves as an abutment for the unillustrated head of a seat occupant of a vehicle. The headrest 10 includes a base 13 with which the headrest 10 is fastenable to the vehicle seat. The base can for this purpose for example comprise guide bars that are mountable and arrestable in guide sleeves anchored in the seat. Alternatively, the base can however be fastened to the seat or the vehicle structure in any conceivable way.

A four-bar linkage 14 is formed by pivotal links between the base 13 and the head piece 11. The four-bar linkage 14 includes a first link 15 and a second link 16. The link 15 is connected by at least one pivot $G_1$, in particular two coaxial pivots $G_1$, with the base 13 and at least one pivot $G_3$, in particular two coaxial pivots $G_3$, with the head piece 11. The link 16 is connected by at least one pivot $G_2$, in particular two coaxial pivots $G_2$, with the base 13, and at least one pivot $G_4$, in particular two coaxial pivots $G_4$, with the head piece 11.

Figure 5:
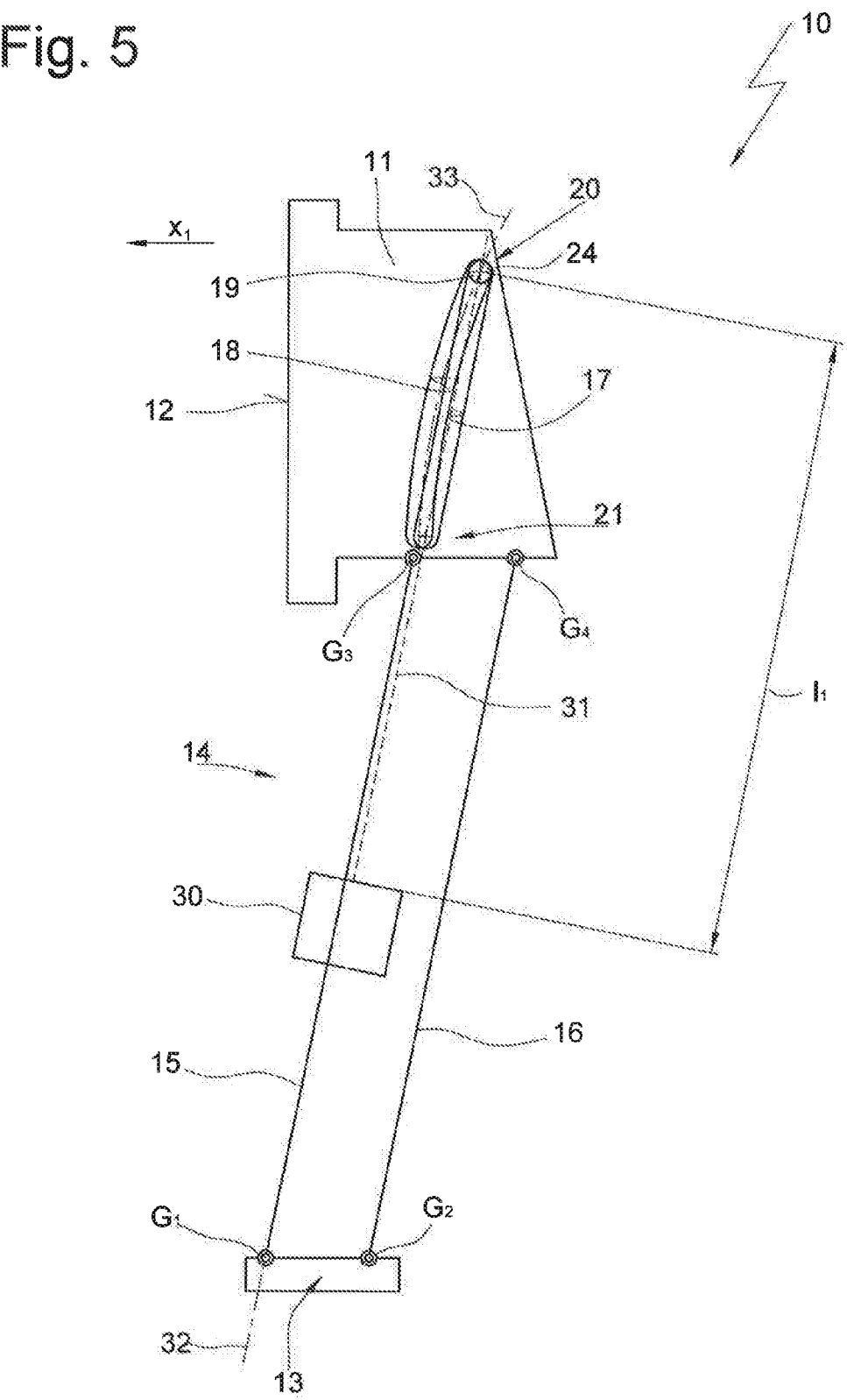
FIG. 5 is a side view of the headrest according to view arrow A in FIG. 4 in a first, rear position.
Figure 7:
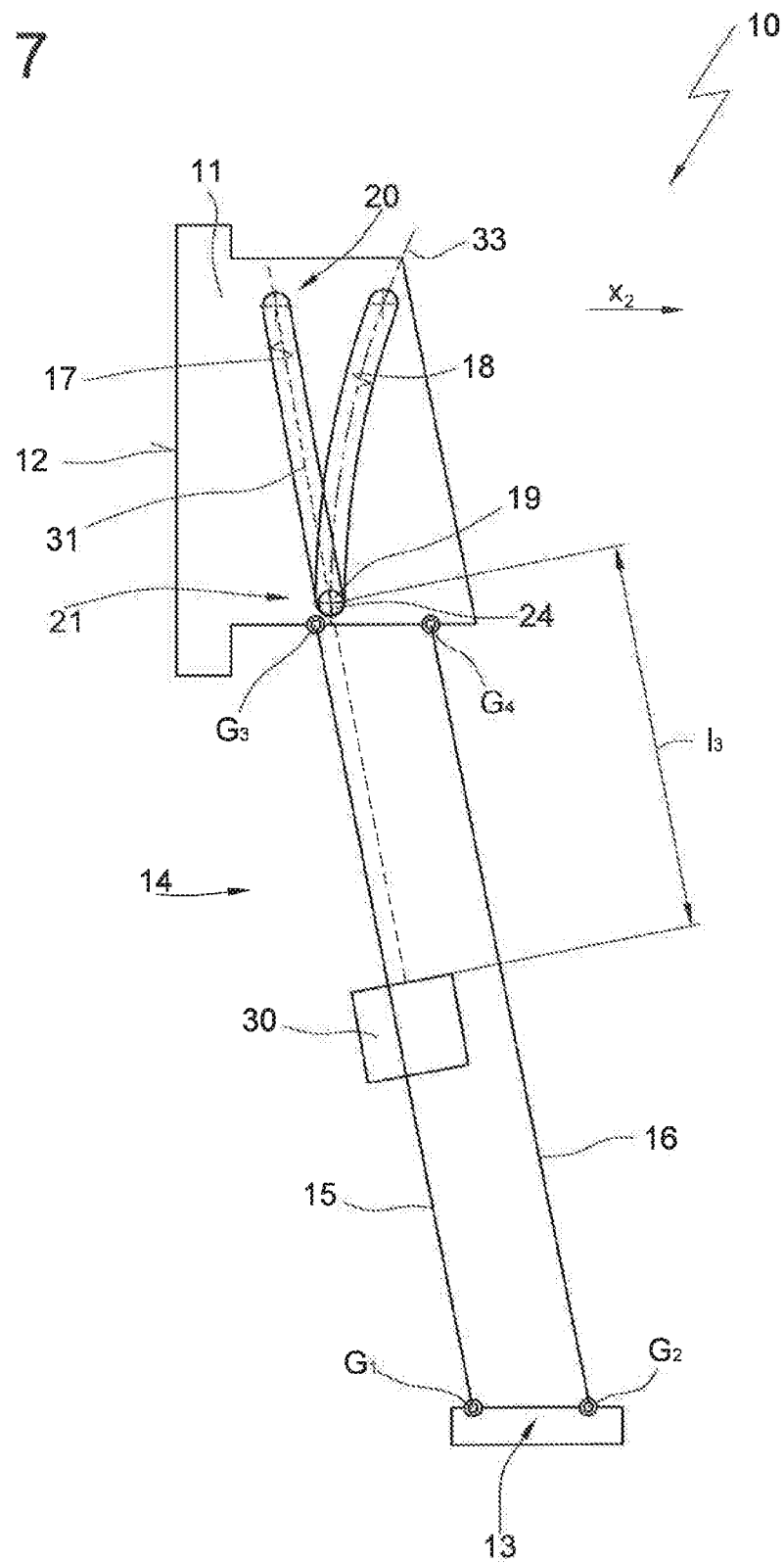
FIG. 7 is a side view of the headrest according to FIG. 3 in the second, forward position.

In this way, the head piece 11 is moveable in directions $x_1$ and $x_2$ between a first position shown in FIG. 5 and a second position shown in FIG. 7. Due to the mounting on the four-bar linkage 14, the head piece 11 in each position assumes a defined angular position relative to the four-bar linkage 14. In other words, an angle α between the longitudinal central axis of the link 15 and for example a lower side of the head piece 11, and the angle β between the longitudinal central axis 15 and for example an outer surface of the base 13 change on movement between the first position and the second position.

Figure 3:
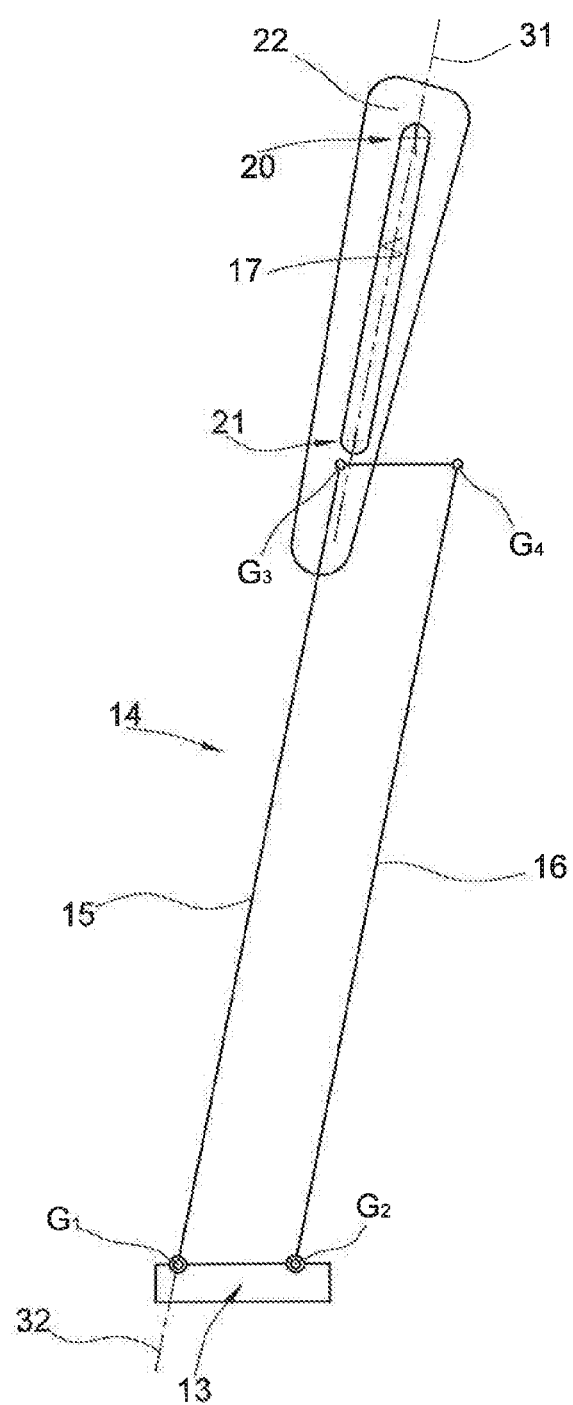
Figure 6:
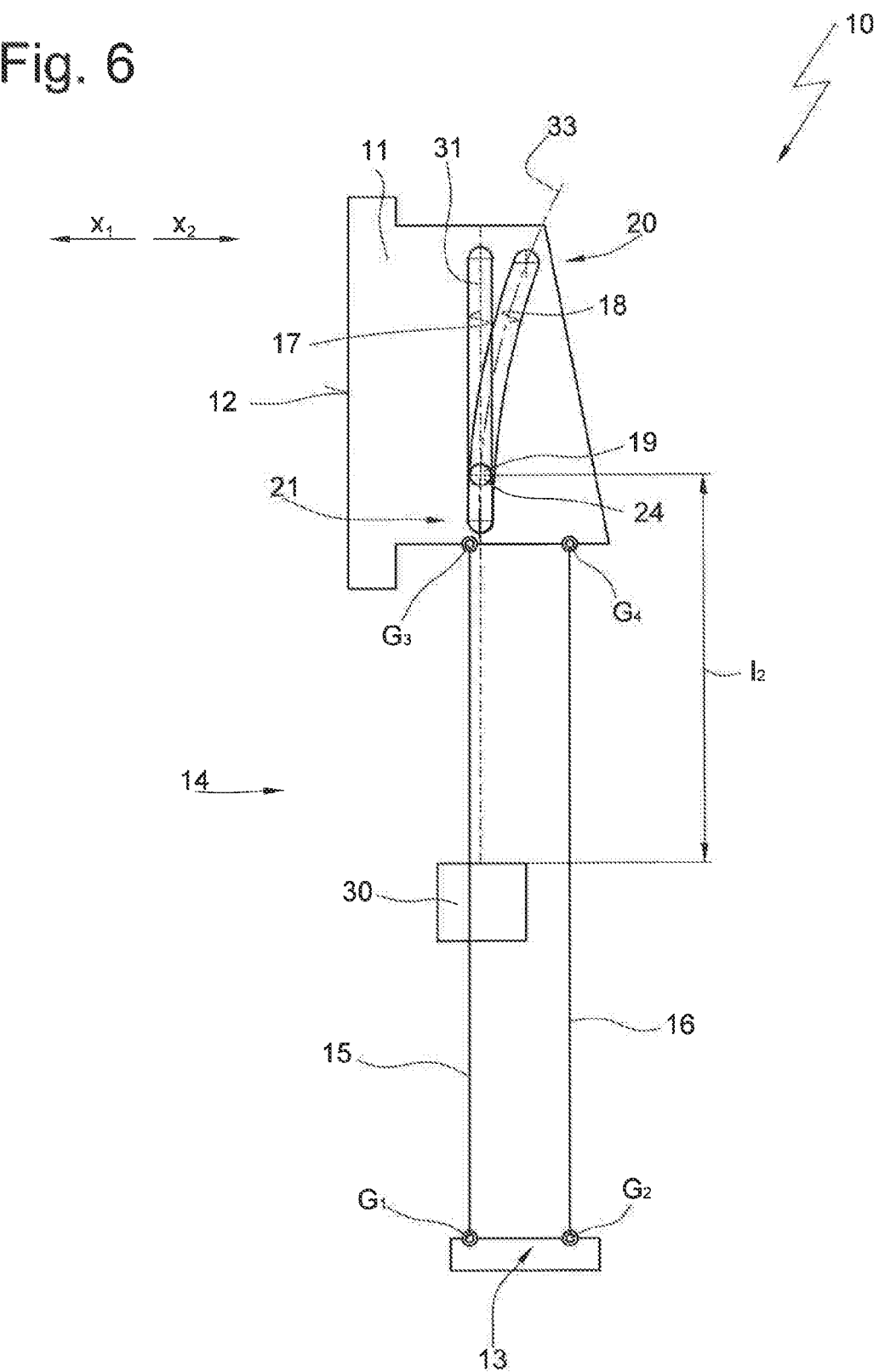
FIG. 6 is a side view of the headrest according to FIG. 5, but with the head piece in an intermediate position between the first position and a second position.

At least one first slotted link 17 whose longitudinal central axis 31 (see FIG. 3) extends parallel to a longitudinal central axis 32 of the link 15 and is fixed to one of the links 15 or 16 (see FIG. 3), in the present embodiment with the first link 15. The first slotted link 17 is formed in a slotted link portion 22 that is not shown in FIGS. 5 to 7 for the sake of the overview.

Figure 2:
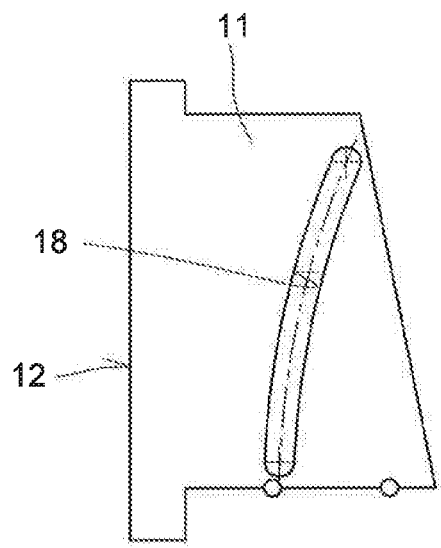
FIG. 2 is a side view of the head piece of the headrest, FIG. 3 schematically shows a subassembly including a base as well as a four-bar linkage of the headrest.

At least one second slotted link 18 is fixed (see FIG. 2) to the head piece 11. The slotted link 18 can for example be molded onto the head piece 11 or fastened thereto. A longitudinal midline 33 (FIG. 1) of the slotted link 18 follows a path of movement followed by an adjusting element 19 that moves, during movement of the head piece 11, between the first position and the second position, from a primary end of the slotted link 17 to a secondary end 21, and it engages into the slotted link 17 and into the slotted link 18. The adjusting element 19 is part of an adjuster 36.

Figure 4:
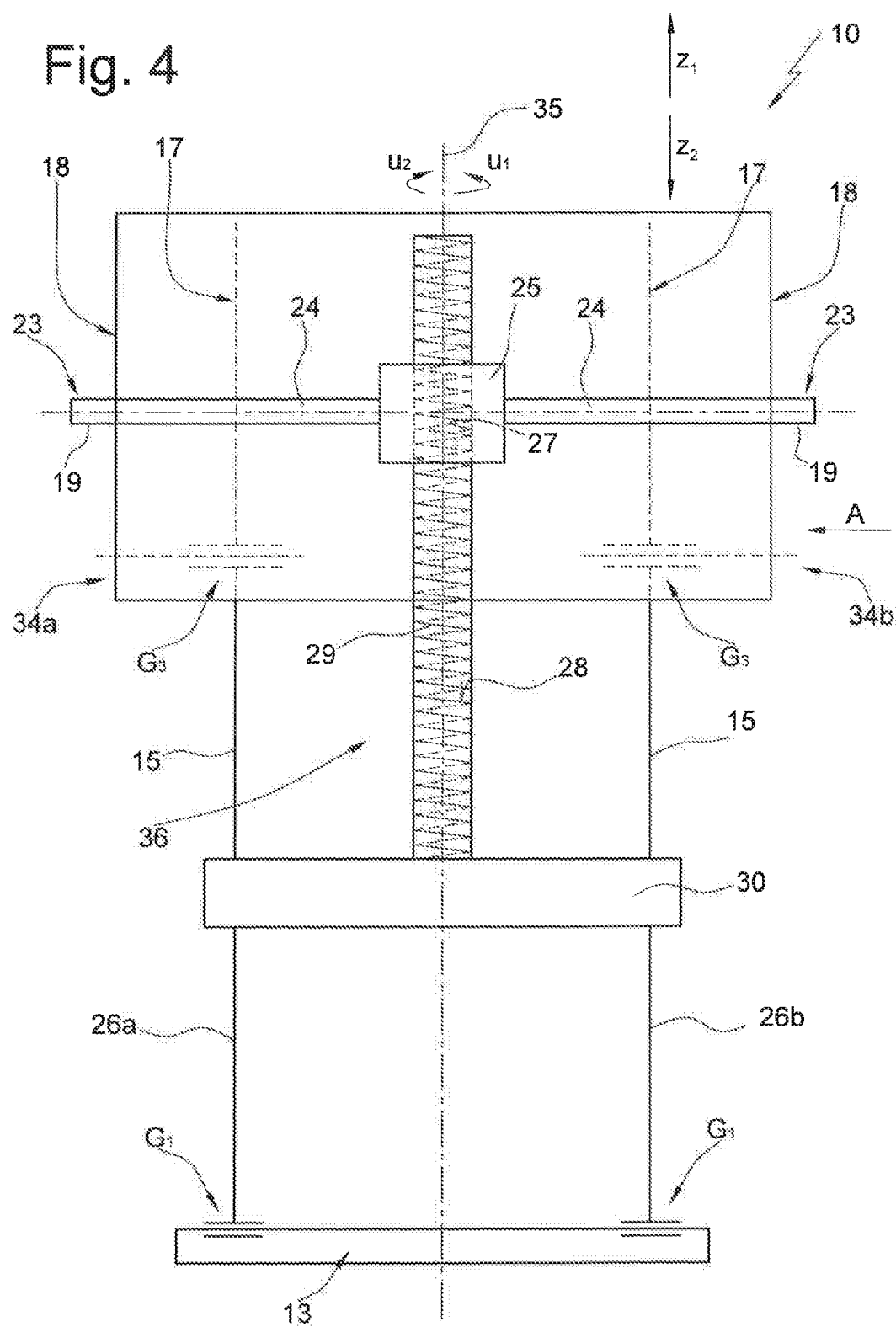
FIG. 4 is a front view of the headrest.

According to FIG. 4, the adjusting element or slide block 19 is formed from the end 23 of an axle 24. The axle 24 is fastened to a spindle nut 25, so that the adjusting element 19 is indirectly fastened to the spindle nut 25. In the embodiment, two axles 24 extend from the spindle nut 25 in opposite directions and respectively form the adjusting element 19 that acts together with slotted links 17 and 18 that flank the head piece 11.

In the present embodiment, the first link 15 comprises two links 26a and 26b, movably connected with and spaced from each another and each connected with a respective first slotted link 17. The second link 16 likewise comprises two such movably connected links, of which only one is shown. Further, a second such slotted link 18 is formed on each of the opposite end faces 34a and 34b of the head piece 11.

The spindle nut 25 is provided with an internal thread 27 that meshes with an outer thread 28 of a spindle 29. The spindle 29 is rotatable around a longitudinal central axis 35 in the directions $u_1$ and $u_2$, and is drivable in the rotational directions $u_1$ and $u_2$ by a drive 30, in particular a motor to move the spindle nut 25 in directions $z_1$ or $z_2$, depending on the rotation direction. In this way, the slide block 19 is movable between the ends 20 and 21 of the slotted link 17, and adjusts the relative position between the head piece 11 and the four-bar linkage 14. That has the consequence that the head piece 11 moves between the first position and the second position.

According to FIG. 5, the adjusting element 19 is at a spacing $I_1$ from the drive 30, and the head piece 11 is in the first position to form a certain angle between the link 15 and the head piece 11. According to FIG. 6, a spacing $I_2$ exists between the adjusting element 19 and the drive 30, and the adjusting element 19 is moved further toward the end 21 and the head piece 11 is in an intermediate position between the first position and the second position. According to FIG. 7, the adjusting element 19 is in the end 21, a spacing $I_3$ between the adjusting element 19 and the drive 30 is set, and the head piece 11 is in the second position.

In addition, relative movement between the head piece 11 and the four-bar linkage 14 is arrestable by the adjusting element 19, because it prevents relative movement in its rest position. In the present embodiment, the adjuster 36 is subject to a self-locking, so that the adjusting element cannot be moved unintentionally. Here, it prevents movement of the four-bar linkage 14.

The invention claimed is:

1. A headrest comprising:
   a base carrying the headrest on a seat,
   a head piece forming an abutment for a head,
   a four-bar linkage including a first link and a second link therebehind in a direction of displacement, each link being secured at a pivot with the base and a pivot with the head piece such that the head piece is movable by the four-bar linkage relative to the base between a first end position and a second end position, and
   an adjuster that alters and/or arrests the relative position between one of the links and the head piece, or between one of the links and the base, the adjuster having:
      a first slotted link fixed on one of the first and second links,
      a second slotted link fixed on the head piece or the base and having a longitudinal central axis, and
      a slide block engaged in slots of the first and second slotted links and movable along a motion path corresponding to the longitudinal central axis from a primary end of the first slotted link to a secondary end during movement of the head piece between the first position and the second position.

2. The headrest according to claim 1, wherein the adjuster includes a drive coupled to the slide block.

3. The headrest according to claim 2, wherein the adjuster includes a transmission to convert movement of the drive into movement of the slide block.

4. The headrest according to claim 3, wherein the transmission comprises a spindle rotatably driven by the drive, the spindle moving a spindle nut connected to the slide block, or the transmission comprises a spindle that is rigidly connected with the slide block, the spindle nut being rotatably driven by the drive.

5. The headrest according to claim 1, wherein each link is formed by two link elements connected with one another and pivoted on opposite ends of the head piece.

6. A headrest comprising:
- a base carrying the headrest on a seat,
- a head piece forming an abutment for a head,
- a four-bar linkage including a first link and a second link therebehind in a direction of displacement, each link being secured at a pivot with the base and a pivot with the head piece such that the head piece is movable by the four-bar linkage relative to the base between a first end position and a second end position, and
- an adjuster that can alter and/or arrest the relative position between one of the links and the head piece, or between one of the links and the base, the adjuster having:
  - a first slotted link fixed on one of the first and second links,
  - a second slotted link fixed on the head piece or the base,
  - a slide block engaged in slots of the first and second slotted links,
  - a spindle secured in the base and threadedly engaged with the slide block or a spindle nut on the slide block, and
  - a rotary drive connected to the spindle or to the spindle nut for rotating the spindle and thereby shifting the slide block relative to the base.

* * * * *